United States Patent [19]

Gama

[11] 3,981,080

[45] Sept. 21, 1976

[54] MECHANICAL DEVICE FOR ASTRONOMICAL CALCULATION

[76] Inventor: Mario Gama, Rua de Jose Acursio das Neves, No. 5-20 Esq., Lisbon, Portugal

[22] Filed: Nov. 11, 1975

[21] Appl. No.: 630,915

[30] Foreign Application Priority Data

Nov. 12, 1974 Portugal.............................. 62921

[52] U.S. Cl..................................... 33/1 SC; 35/47
[51] Int. Cl.²......................................... G01C 21/24
[58] Field of Search............... 33/1 SA, 1 SC, 1 SR, 33/1 R; 35/47, 46 R, 46 A

[56] References Cited
UNITED STATES PATENTS

| | | | |
|---|---|---|---|
| 533,340 | 1/1895 | Beehler.............................. | 33/1 SA |
| 2,349,515 | 5/1944 | Oberst.................................... | 35/47 |
| 2,408,651 | 10/1946 | Kiehl................................... | 35/46 R |
| 2,443,240 | 6/1948 | Hagner.............................. | 33/1 SA |
| 2,694,859 | 11/1954 | Gwillam............................. | 33/1 SA |

*Primary Examiner*—William D. Martin, Jr.
*Attorney, Agent, or Firm*—Haseltine, Lake & Waters

[57] ABSTRACT

A mechanical device adapted for determining the position of an observer by star-sight observations comprising a hollow portable sphere, having a number of sets of pairs of holes, the two holes in each set lying at diametrical extremities by which the sphere can be releasably engaged in a rigid ring, such that the sphere is rotatably mounted in the ring for rotation about an axis passing through the diametrically-opposed holes. A slidable carriage is mounted on the ring for travel in the plane thereof and markings are formed on the ring for determining the position of the carriage thereon. The position of an observer is determined from three simultaneous observations of suitably selected stars by means of the corresponding true circles of altitudes which are inscribed on the surface of the sphere for observation. star of obsevation.

7 Claims, 8 Drawing Figures

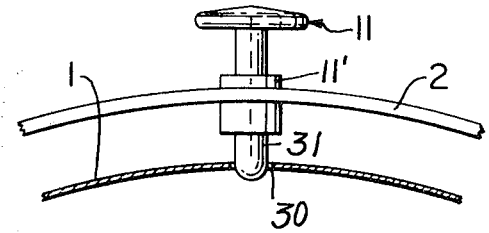
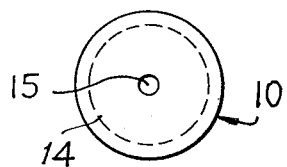
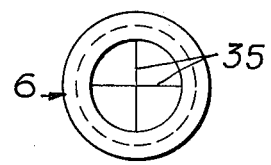
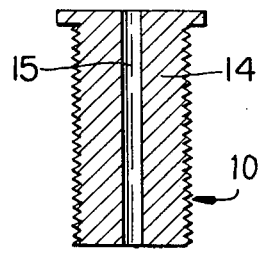
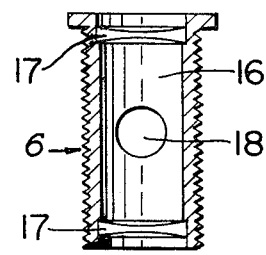
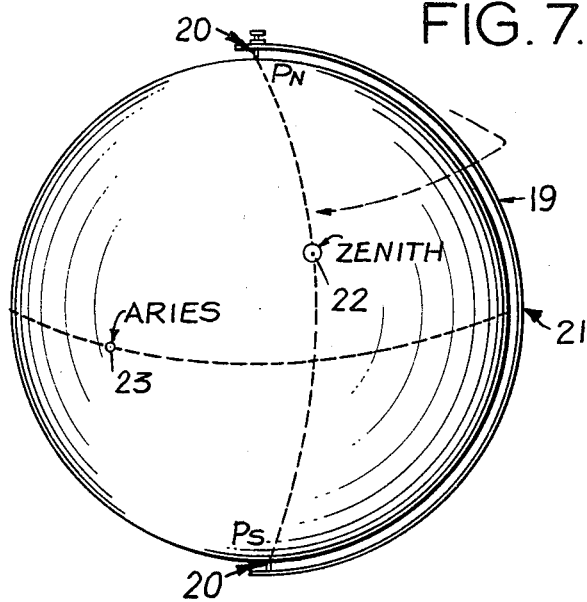
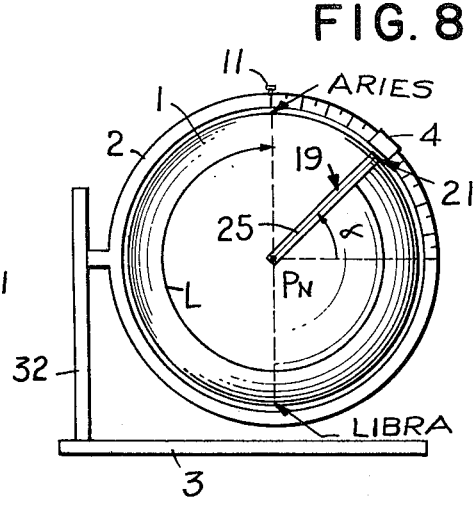

MECHANICAL DEVICE FOR ASTRONOMICAL CALCULATION

FIELD OF THE INVENTION

The invention relates to a mechanical device for astronomical calculations which device is constituted as a precision instrument which permits determination of the position of the observer on the face of the earth by means of star sights and a mechanical arrangement.

SUMMARY OF THE INVENTION

An object of the invention is to provide apparatus for solving the problems of astronomical navigation, geodetical surveying and spherical triangles and specifically of solving the PXZ position triangle. According to the invention there is provided a mechanical device adapted for determining the position of an observer by star sight observations, said device comprising a hollow sphere having a number of sets of pairs of holes, the two holes in each set lying at diametrical extremities, a rigid ring, means on said ring for engaging two diametrically opposed holes to rotatably mount said sphere in said ring such that a plane through said ring passes through a great circle on said sphere, slidable carriage means on said ring for travel in the plane thereof, and marking means on said ring for determining the position of said carriage means thereon.

The mechanical device further comprises a plotting means selectively engageable with said carriage means for the drawing of circles on said sphere according to the true altitude of each star sight, and a reader means selectively engageable with said carriage means in place of the plotting means, for measuring the location of points on the surface of the sphere in accordance with the position of the carriage means.

The mechanical device further comprises an accessory means for measuring the longitudinal position of the observer, said accessory means comprising a semicircular arc, made from a transparent material, corresponding to the quadrant of altitude of early globes which is fitted on the sphere.

BRIEF DESCRIPTION OF THE DRAWING

FIG. 4 is an enlarged side view, partly in section of a portion of a locking means in FIG. 3, FIG. 5a is a cross sectional view of a plotting drum mountable on the carriage in FIG. 2, FIG. 5b is a top plan view of the drum of FIG. 5a, FIG. 6a is a cross sectional view of a reading drum mountable on the carriage in FIG. 2, FIG. 6b is a top plan view of the drum of FIG. 6a, FIG. 7 is a perspective view showing an arc element corresponding to a quadrant of altitude fitted on the sphere for purposes of illustration, and FIG. 8 is a side elevational view showing the use of the arc element and ring for measuring equatorial arc to determine the longitude.

DETAILED DESCRIPTION

Figure 1:
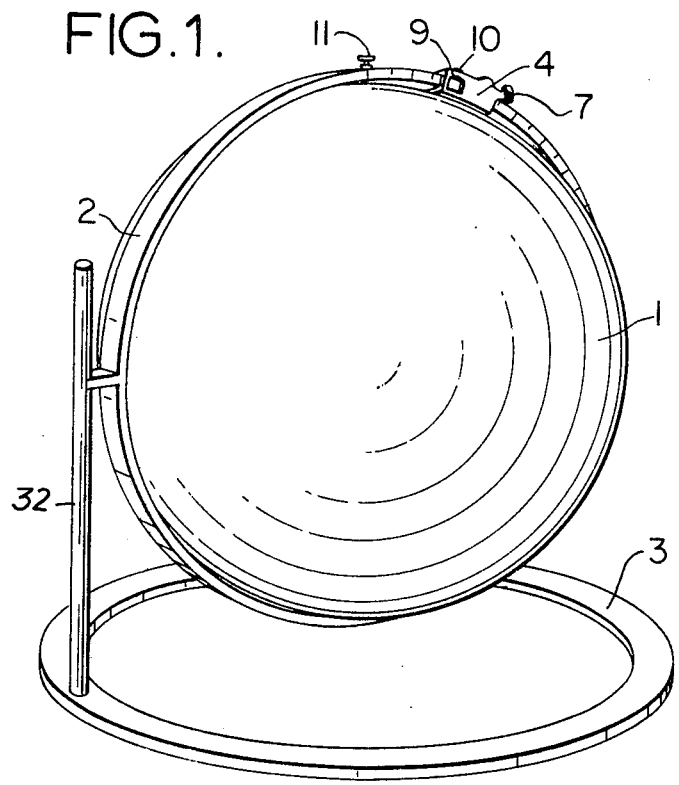
FIG. 1 is a perspective view of a sphere mounted on a support according to the apparatus of the invention.
Figure 3:
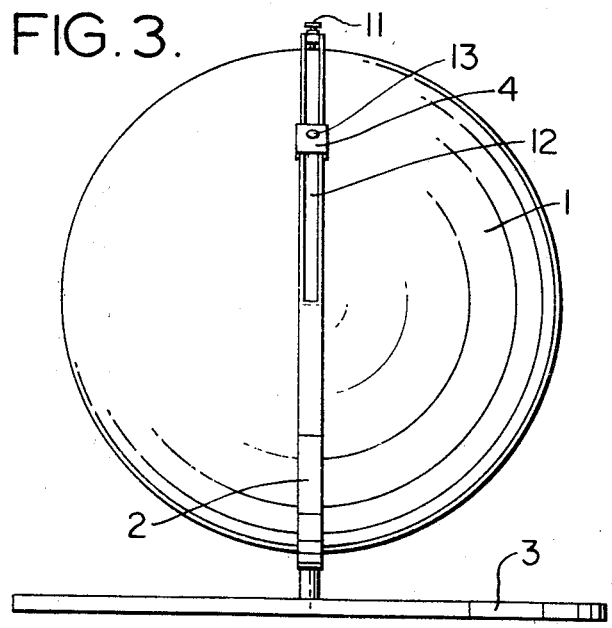
Figure 2A:
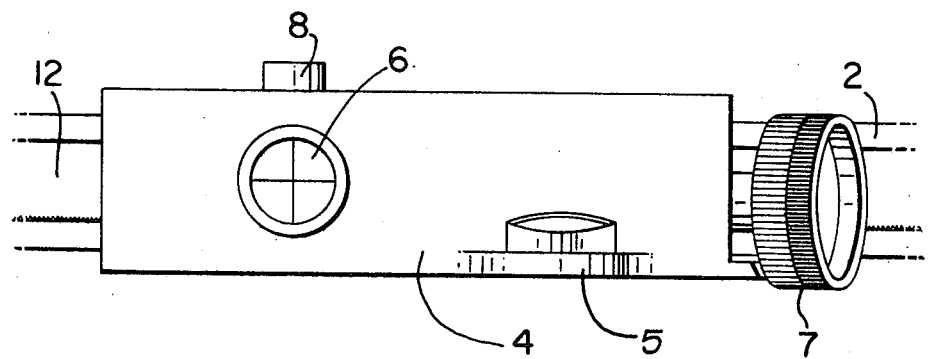
FIG. 2a is a top plan view of a carriage of micrometer drum, with its components.
Figure 2B:
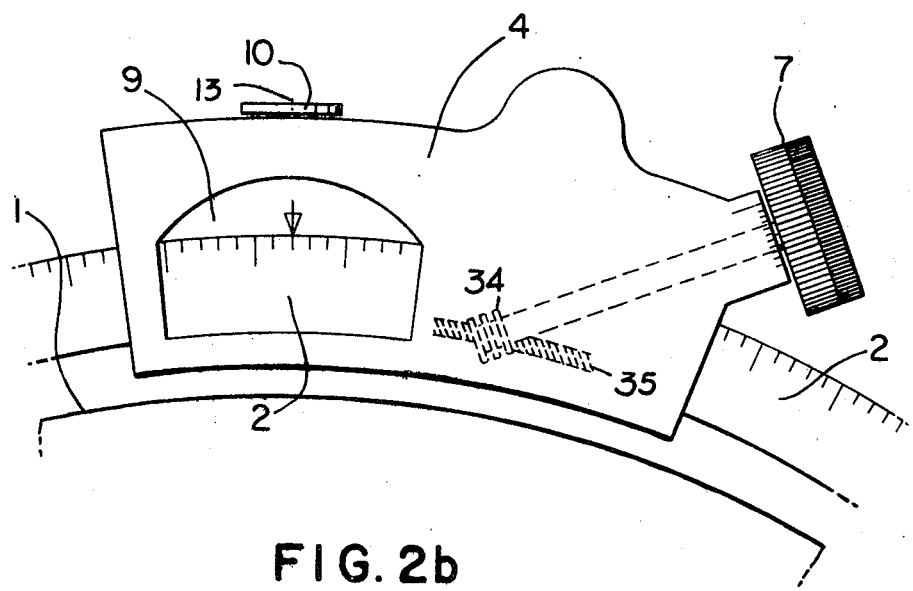
FIG. 2b is a side elevational view of the carriage in FIG. 2a, FIG. 3 is a side view of the apparatus of FIG. 1.

The instrument of the invention comprises a globe or sphere 1 adapted for the accurate determination of the position of an observer by means of star sights, (star true altitude) and time.

Star sight observations are carried out between twilight and dawn using either an ordinary sextant, a bubble sextant or an electronic sextant. Complementary accessories required are a stop-watch for measuring elapsed time, a rated chronometer and the Nautical Almanac.

The sphere has a maximum outer diameter of 860mm, this dimension being selected to permit determining the relative position with an accuracy to the nearest minute of arc.

For air navigation, the diameter may be reduced to 340mm since with the wider amplitude of the visual horizon there is less need for determining a very accurate fix.

The surface of the sphere is smooth and colored to permit the plotting thereon of fine and visible lines.

The sphere 1 is provided with a number of pairs of diametrically opposed holes 30 (FIG. 4) corresponding to:

a. positions of the North and South Poles relative to the average of the nearest five years (taking into account the variations due to the precission and nutation of the Earth).
b. Aries and Libra points (on the Celestial Equator).
c. a set of selected stars and the antipodal positions thereof.

The sphere of globe 1 is mounted on two small diametrically opposed pivots 31 which fit in one of each pair of holes 30.

The pivots are held in a rigid ring 2 which is itself supported by an upright column 32 mounted on a base 3.

To counteract rolling of a vessel on which the apparatus is mounted, the apparatus as a whole may be mounted on gimbals (not shown) rendering it independent of swinging movements.

To permit setting the sphere on a flat surface, a small spherical segment thereof can be cut off in a region which is usually not used such as in the proximity of the Poles.

To avoid problems arising form thermal expansion or contraction, the sphere 1 and the rigid ring 2 on which it is mounted are made of the same material, such as, aluminum alloy, plastics, or the like, of uniform thickness.

The dimensions of the rigid ring permit the mounting thereon of a sliding carriage of micrometer drum 4 which may be secured in any given position or displaced along a graduated quadrant starting from zero degrees, on the horizontal axis on the side opposite the supporting column 32, up to 90° at the top of the vertical axis of the ring.

A worm-screw 34 on the carriage 4 meshes with teeth 35 spaced at one degree intervals provided on the rigid ring 2.

To allow larger displacement of the carriage 4, the carriage 4 is provided with a clutch 5 which allows selective coupling or uncoupling of the worm screw 34 from the shaft of the micrometer carriage. The micrometer carriage has a scale on knob 7 divided into 60 equal parts which measure minutes of arc. The number of degrees is read on the scale on ring 2 and the fractions in minutes are read on the scale of the knob 7 of the micrometer carriage.

On the left-face of the carriage 4 there is a window opening 9 provided with an arrow which marks the reference points of readings and which is precisely contained in the transverse plane of the axis of a hole 13 provided in the platform of the carriage 4 which has an inner female thread selectively allowing the threading therein of either a reading device 6 or a plotting device 10. The plotting device 10 comprises a solid body 14 having a bore 15 for permitting the insertion of a pencil lead for plotting circles on the surface of the sphere and the reading device comprises a tubular body 16 provided with an optical system composed of two lenses 17 and a sight formed by two perpendicular cross wires 35. The body 16 of the reading device has an aperture 18 for passing a light beam from a bulb contained in a chamber 8 attached to body 16.

The sphere 1 when mounted in the rigid ring 2 can revolve around a vertical axis common to both the sphere and ring.

The upper point of rotation on the axis is provided by a spring-loaded stem 11 mounted in a ring 11' threaded in ring 2 at the lower end of which stem is pin 31 so that by raising the stem 11 the pin 31 can be disengaged from the hole 30 in the sphere and thus the sphere can be removed or its position modified within the rigid ring on the vertical axis common to both.

The graduated portion of the rigid ring has a slot 12 along its middle part allowing viewing of the surface of the sphere lying under the graduated quadrant.

The operation for obtaining the position of an observer by simultaneous observation of three selected stars is extremely simple and is effected as follows: The sphere 1 is installed in the rigid ring 2 and it is retained therein by engaging pin 31 with a hole of the sphere by means of the stem 11 in such a manner that the hole corresponding to each one of the stars is successively fitted at the upper point of revolution.

With the plotting device 10 threaded in opening 13 of the micrometer carriage 4 the carriage is then displaced to the position corresponding to the true altitude as determined by means of star-sights and measurements and a circle having as a spherical radius the star true zenithal distance, the said circle being plotted on the surface of the sphere.

The plotting device 10 is removed from the carriage and is replaced by the reading device 6 in the same position, and the sphere is then installed in ring 2 so that the upper Celestial pole, i.e., the pole visible at the plotted location engages the upper point of revolution and the sphere is rotated so as to bring the zenith to the plane of the graduated arc on ring 2 so that the altitude of the observer may be read directly from the scale on ring 2 and the micrometer scale.

For determining the longitude of the observer, the sphere is removed from the rigid ring after the latitude of the observer has been obtained; after a number of preliminary operations specified below, the equatorial arc ($\alpha$) is measured, from which the L.H.A. of Aries may be deduced and starting from this result, is compared with the G.H.A. of Aries taken from the Almanac as a function of the G.M.T. of the observation, and the longitude of the observation is obtained.

The equatorial arc ($\alpha$) is measured using a portable semicircular arc element 19, FIG. 7 (corresponding to the quadrant of altitude of early globes) which is fitted on the sphere with diametrically-opposed pins 20 by means of which it may be fixed to the sphere in the plane of its polar axis; there is sufficient clearance between the sphere and the rigid ring to allow the sphere, fitted with the semicircular arc element 19, to be mounted within the rigid ring as seen in FIG. 8.

The arc element 19 has a meridian line 25 engraved on the semicircular arcuate surface running from pivot to pivot, and this is intersected at right angles by a line 21 exactly at the mid-point.

The semicircular arc element 19 is placed on the sphere so that the meridian line 25 coincides with the point of intersection of the three "altitude" arcs on the sphere, i.e., at the zenith 22.

After this procedure, the sphere is again replaced on the rigid ring (FIG.8) in such way that the holes representing the Aries 23 and Libra points are engaged by the upper and lower pivots of the rigid ring in alignment with the vertical axis common to the sphere. The sphere is then rotated around the vertical axis until the Celestial Equator coincides with the plane of the rigid ring, this being accomplished by means of the intersection point 21 engraved midway between the pins 20 of the semicircular element arc 19.

To bring that coinciding position to the plane of the rigid ring, the carriage 4 is displaced on ring 2 and the sphere is rotated until the sight of the reading device is above the point of intersection midway between the pins 20 of the semicircular arc element 19. The angle of the equatorial arc ($\alpha$) is then read directly, this being the end of the preliminary phase for obtaining the longitude L at the time of simultaneous observations of the three stars.

Numerous modifications and variations of the disclosed embodiment will become evident to those skilled in the art without departing from the spirit and scope of the invention as defined in the appended claims.

I claim:

1. A mechanical device adapted for determining the position of an observer by star sight observations, said device comprising a hollow sphere having a number of sets of pairs of holes, the two holes in each set lying at diametrical extremities, a rigid ring, means on said ring for engaging said holes to rotatably mount said sphere in said ring such that a plane through said ring passes through a great circle on said sphere, slidable carriage means on said ring for travel in the plane thereof, and marking means on said ring along a graduated quadrant starting from zero degrees, on a horizontal axis to 90° at the top of the vertical axis of the said ring for determining the position of said carriage means thereon.

2. A mechanical device as claimed in claim 1 further comprising a plotting means selectively engageable with said carriage means for the plotting of circles on said sphere according to star sightings, and a reader also selectively engageable with said carriage means for measuring the location of points on the surface of the sphere in accordance with the position of the carriage means.

3. A mechanical device as claimed in claim 2 wherein said sphere and ring are made of the same material.

4. A mechanical device as claimed in claim 3 comprising a base, and a support mounted on said base and supporting said ring.

5. A mechanical device as claimed in claim 1 wherein said means on said ring for engaging said holes is selectively releasable therefrom.

6. A mechanical device as claimed in claim 2 wherein said carriage means has a hole in which said plotting means and reader are selectively engageable.

7. A mechanical device as claimed in claim 1 wherein said ring includes a pivot system at diametrically opposed extremities of the vertical axis of said ring so that the sphere can be mounted at said diametrically opposed pivots within the rigid ring.

* * * * *